United States Patent [19]

Waters

[11] Patent Number: 5,551,024
[45] Date of Patent: Aug. 27, 1996

[54] SYSTEM FOR IDENTIFYING DATA RECORDS IN A DATABASE USING A DATA STRUCTURE WITH LINKED PARAMETERS IN A SEARCH RANGE

[75] Inventor: Anthony B. Waters, Redmond, Wash.

[73] Assignee: Microsoft Corporation, Redmond, Wash.

[21] Appl. No.: 322,957

[22] Filed: Oct. 13, 1994

[51] Int. Cl.$^6$ ..................................................... G06F 17/30
[52] U.S. Cl. ................................... 395/600; 364/DIG. 1; 364/282.1; 364/282.3
[58] Field of Search ............................................. 395/600

[56] References Cited

U.S. PATENT DOCUMENTS

| | | | |
|---|---|---|---|
| 4,817,036 | 3/1989 | Millett et al. | 395/600 |
| 4,961,139 | 10/1990 | Hong et al. | 395/600 |
| 5,303,367 | 4/1994 | Leenstra, Sr. et al. | 395/600 |
| 5,355,481 | 10/1994 | Sluijter | 395/600 |
| 5,392,390 | 2/1995 | Crozier | 395/161 |
| 5,408,652 | 4/1995 | Hayashi et al. | 395/600 |
| 5,440,730 | 8/1995 | Elmasri et al. | 395/600 |

OTHER PUBLICATIONS

Date, An Introduction to Database Systems, Addison–Wesley, 1986, pp. {58–62}. Dec. 1986.

Bassiouni et al, "On the Definition and Maintenance of Database Views with Time–Varying Domains", Proc of the 13th Annual International Computer Software and Applications Conference, 20–22 Sep. 1989, pp. 201–208 Sep. 22, 1989.

Gunadhi et al, "Efficient Indexing Methods for Temporal Relations", IEEE Transactions on Knowledge and Data Engineering, vol. 5, No. 3, Jun. 1993.

Little et al, "Interval–Based Conceptual Models for Time–Dependent Multimedia Data", IEEE Transactions on Knowledge and Data Engineering, vol. 5, No. 4, Aug. 1993.

Primary Examiner—Wayne Amsbury
Attorney, Agent, or Firm—Lee & Hayes, PLLC

[57] ABSTRACT

A data search structure is provided for nearly instantaneous identification of one or more data records in a database. The data records are characterizable by two or more search parameters. The search structure includes two or more tables which list respective search parameters in a selected order. The tables also contain information that correlates associated search parameters among the tables. A data record key is provided to identify the particular data record corresponding to the search parameters. A method for constructing this search structure is described. Additionally, multiple methods for identifying groups of data records that satisfy a selected search criteria are also described.

30 Claims, 14 Drawing Sheets

| BEGIN INDEX | BEGIN DATE | END DATE | DATA RECORD KEY |
|---|---|---|---|
| 0 | 1912 | 1984 | 4 |
| 1 | 1920 | 1925 | 6 |
| 2 | 1931 | 1945 | 7 |
| 3 | 1939 | 1941 | 3 |
| 4 | 1942 | 1944 | 1 |
| 5 | 1943 | 1946 | 2 |
| 6 | 1947 | 1965 | 5 |

142

| END INDEX | END DATE | BEGIN DATE | DATA RECORD KEY |
|---|---|---|---|
| 0 | 1925 | 1920 | 6 |
| 1 | 1941 | 1939 | 3 |
| 2 | 1944 | 1942 | 1 |
| 3 | 1945 | 1931 | 7 |
| 4 | 1946 | 1943 | 2 |
| 5 | 1965 | 1947 | 5 |
| 6 | 1984 | 1912 | 4 |

144

140

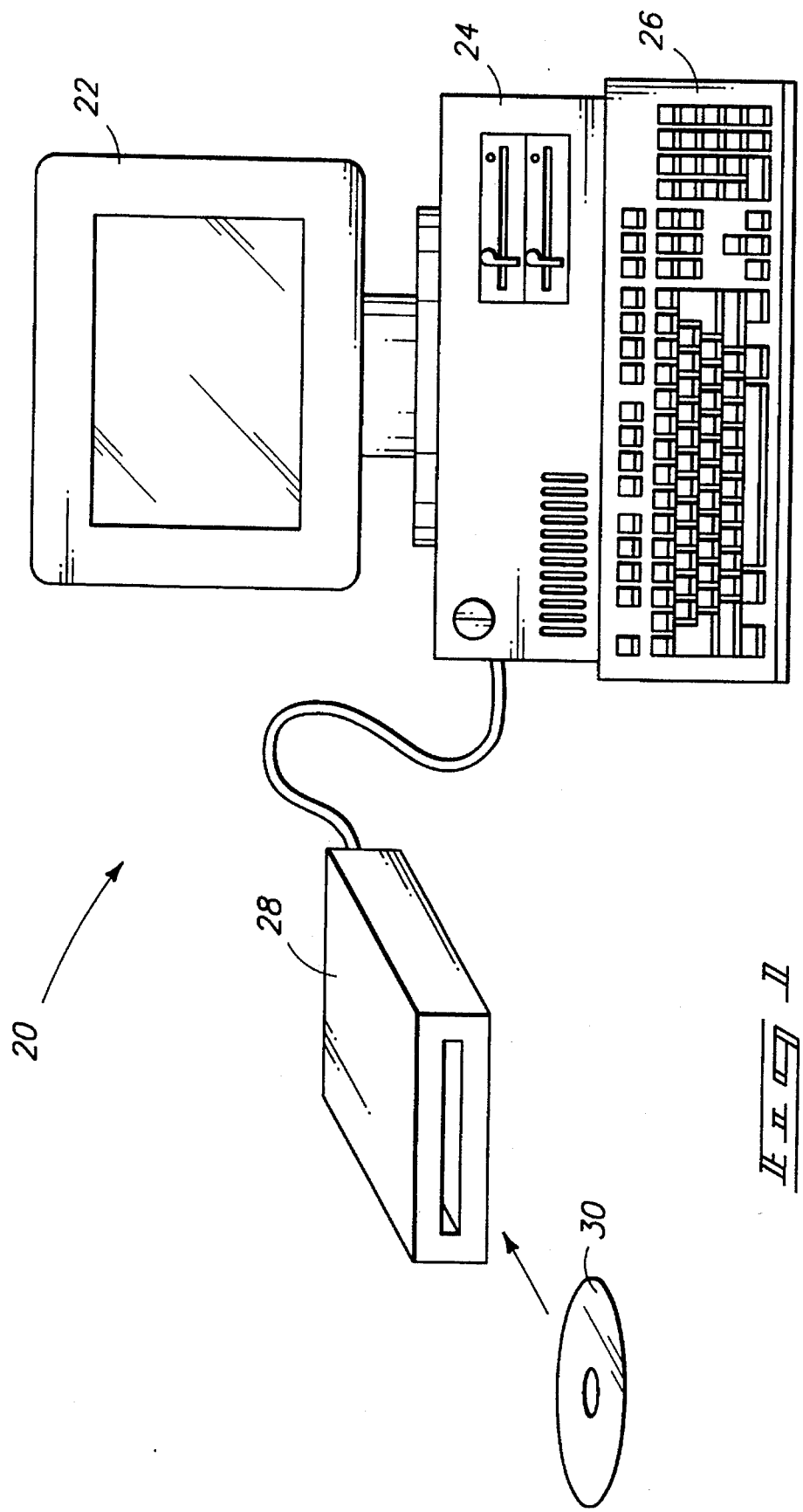

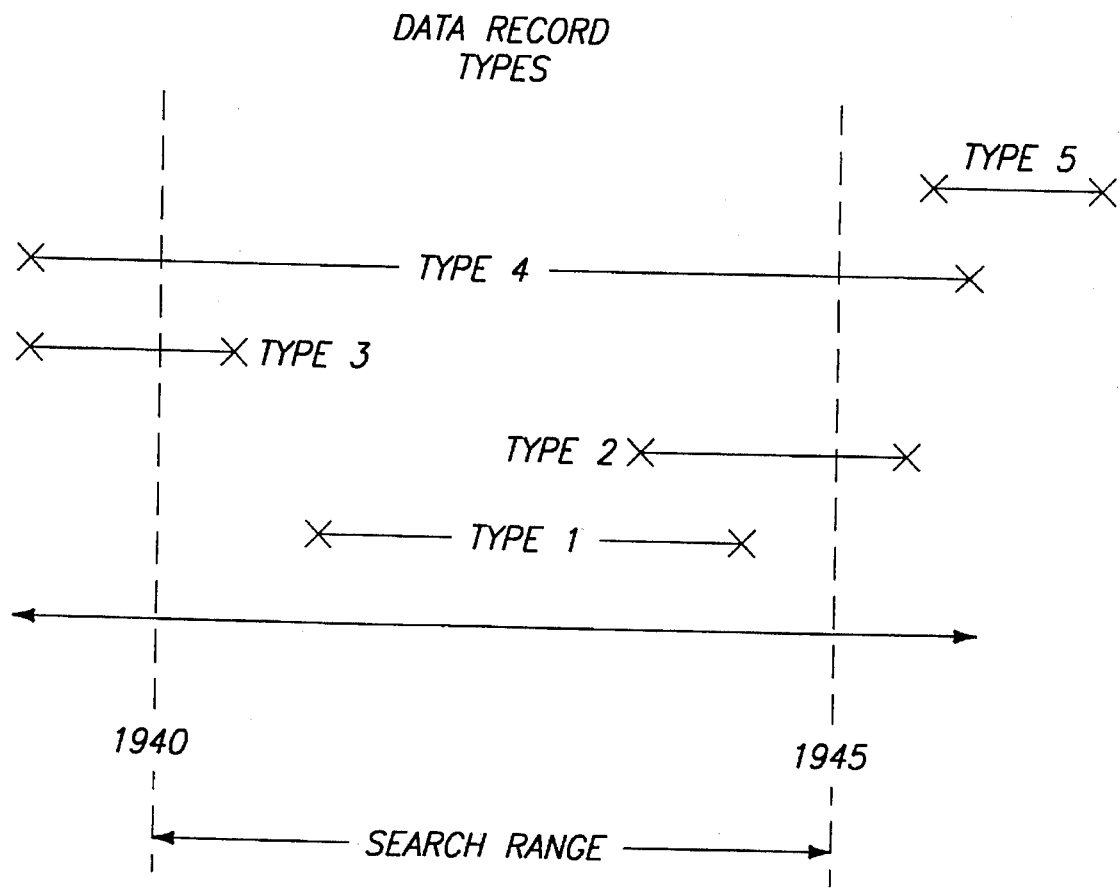

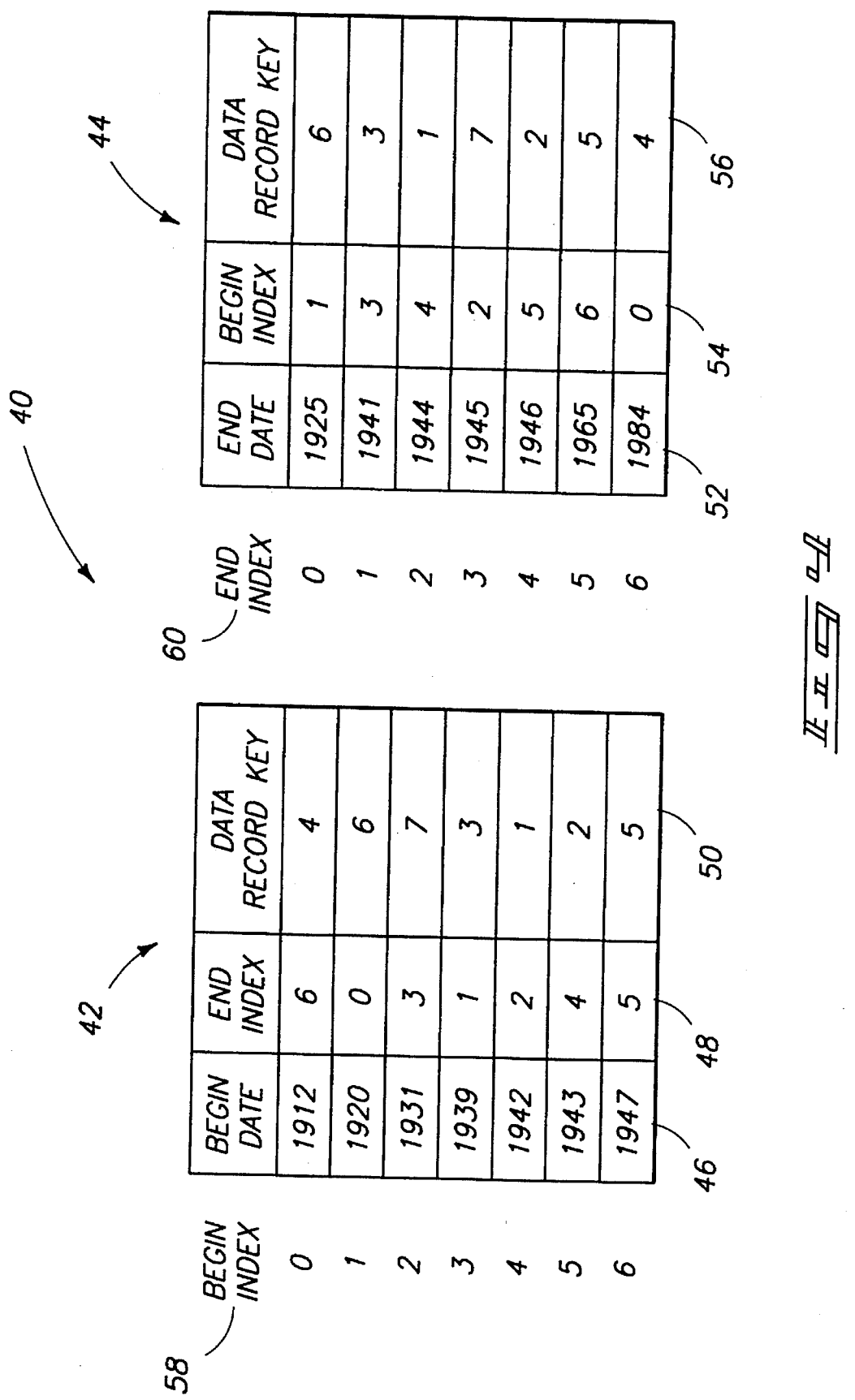

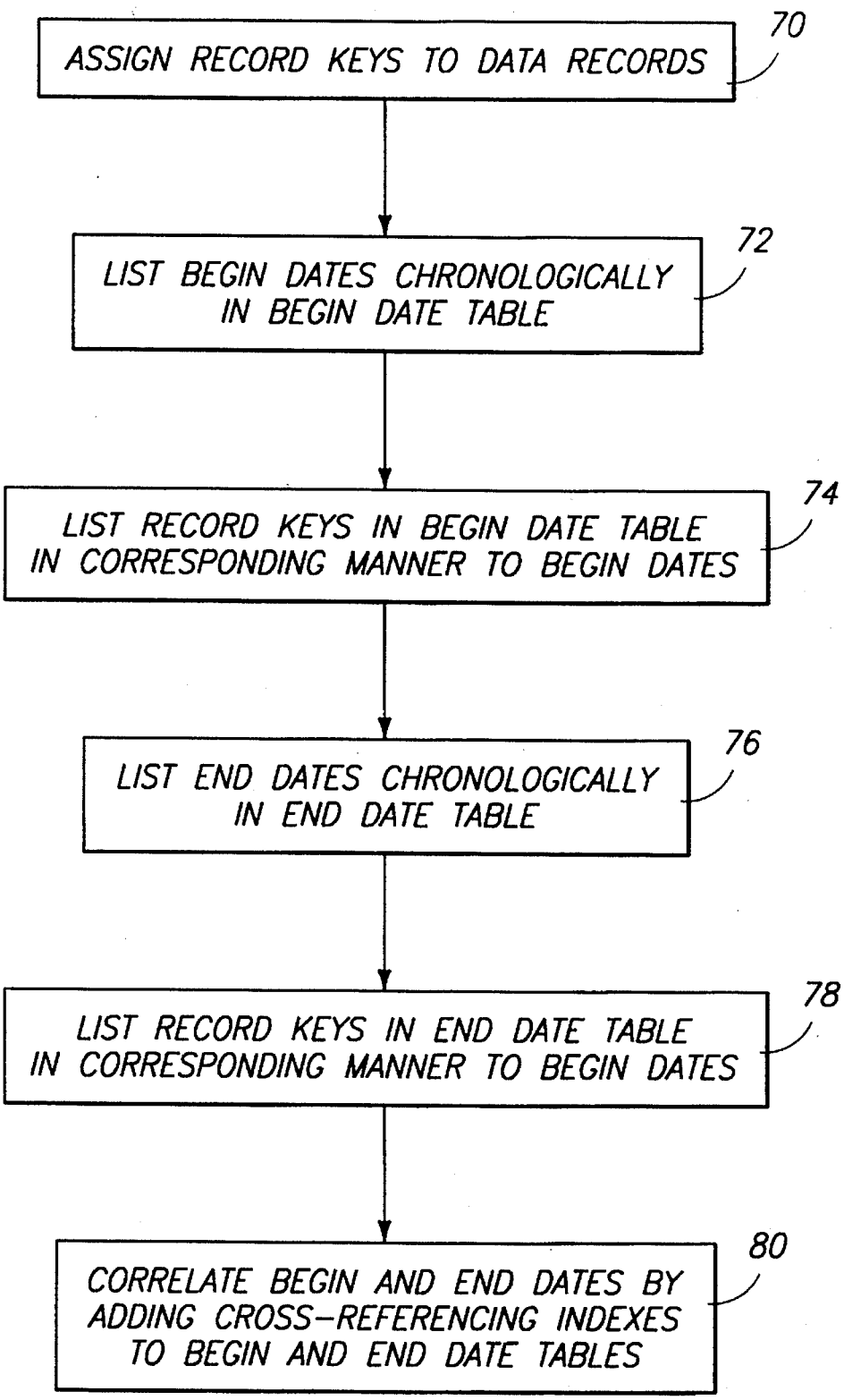

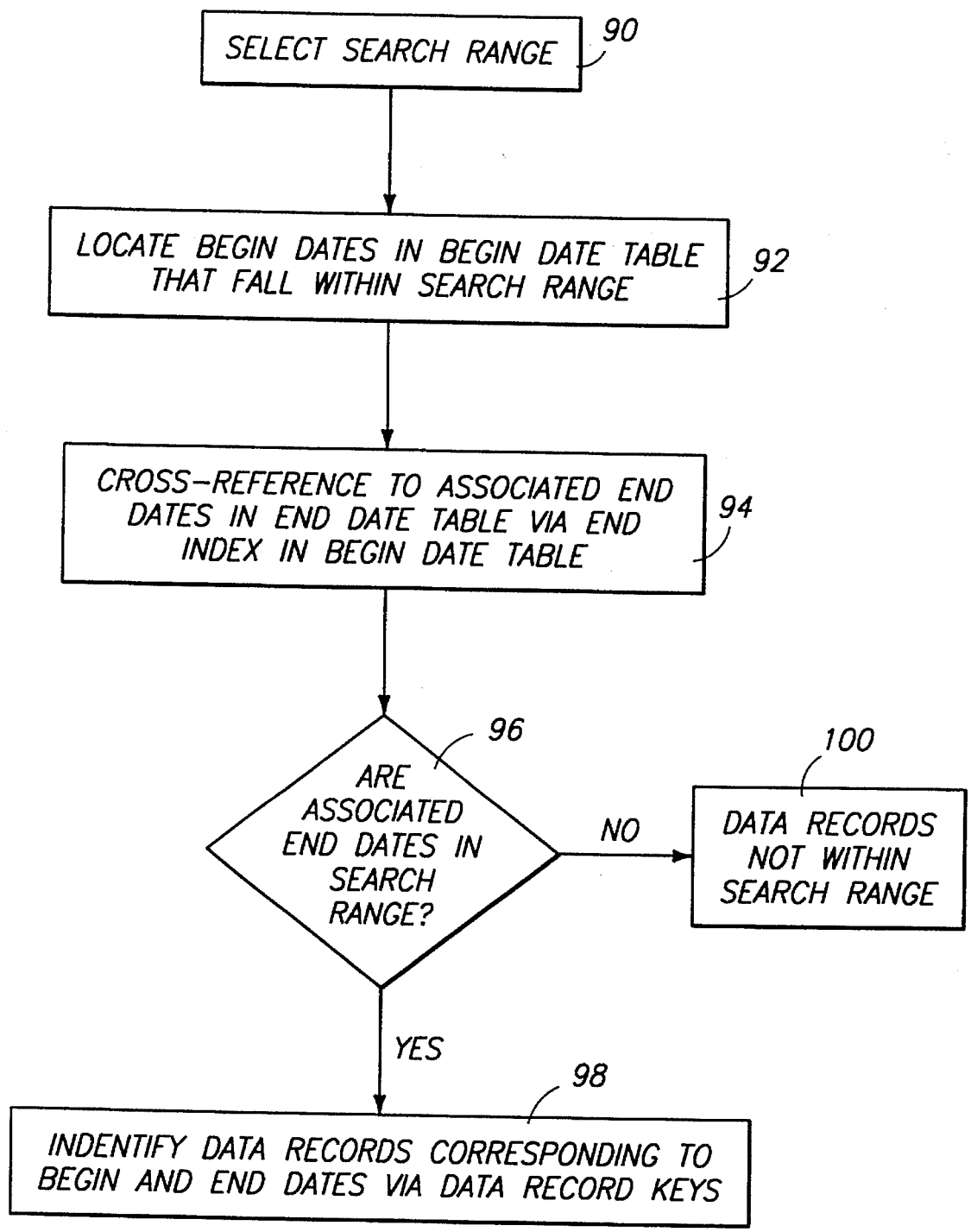

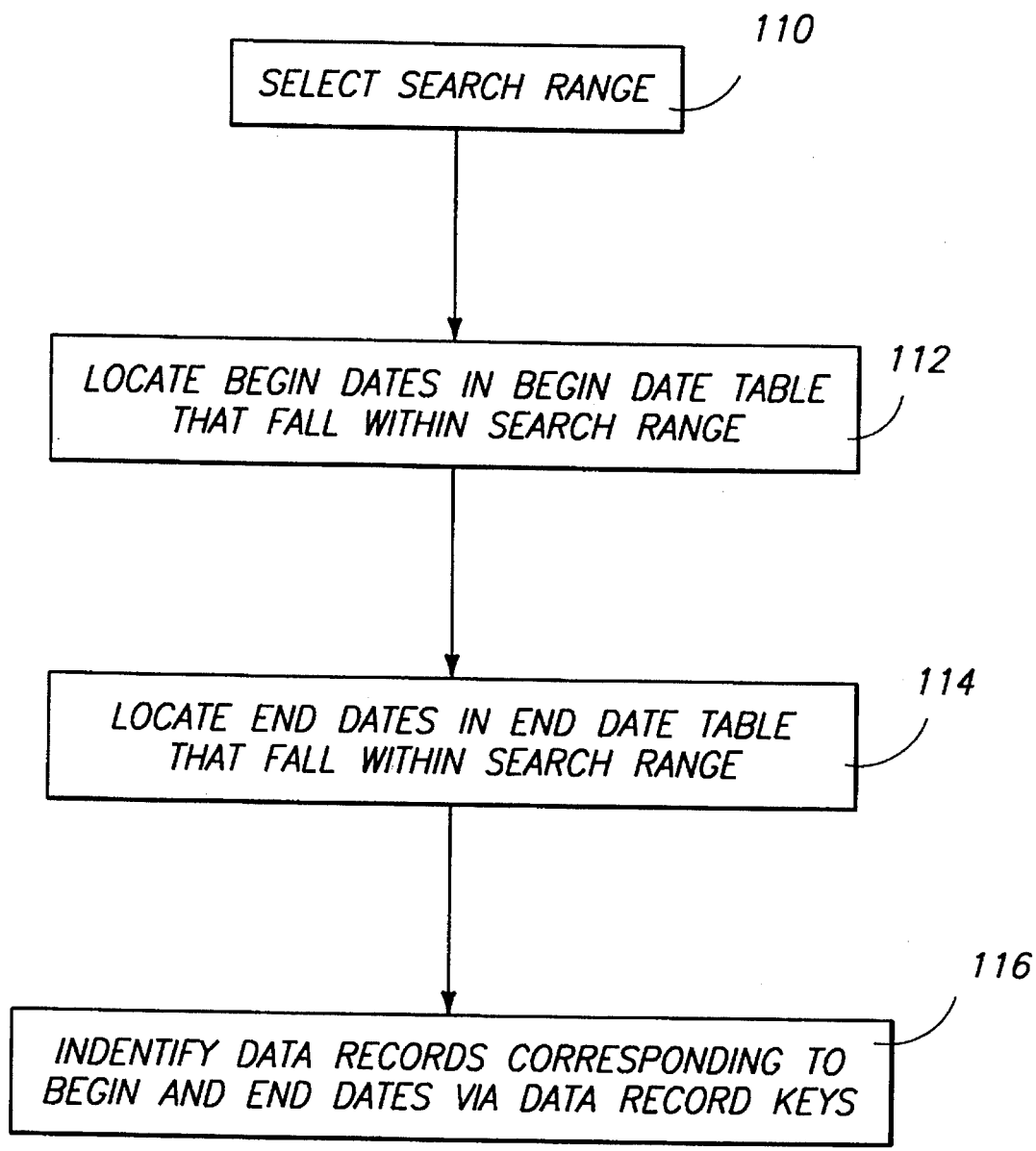

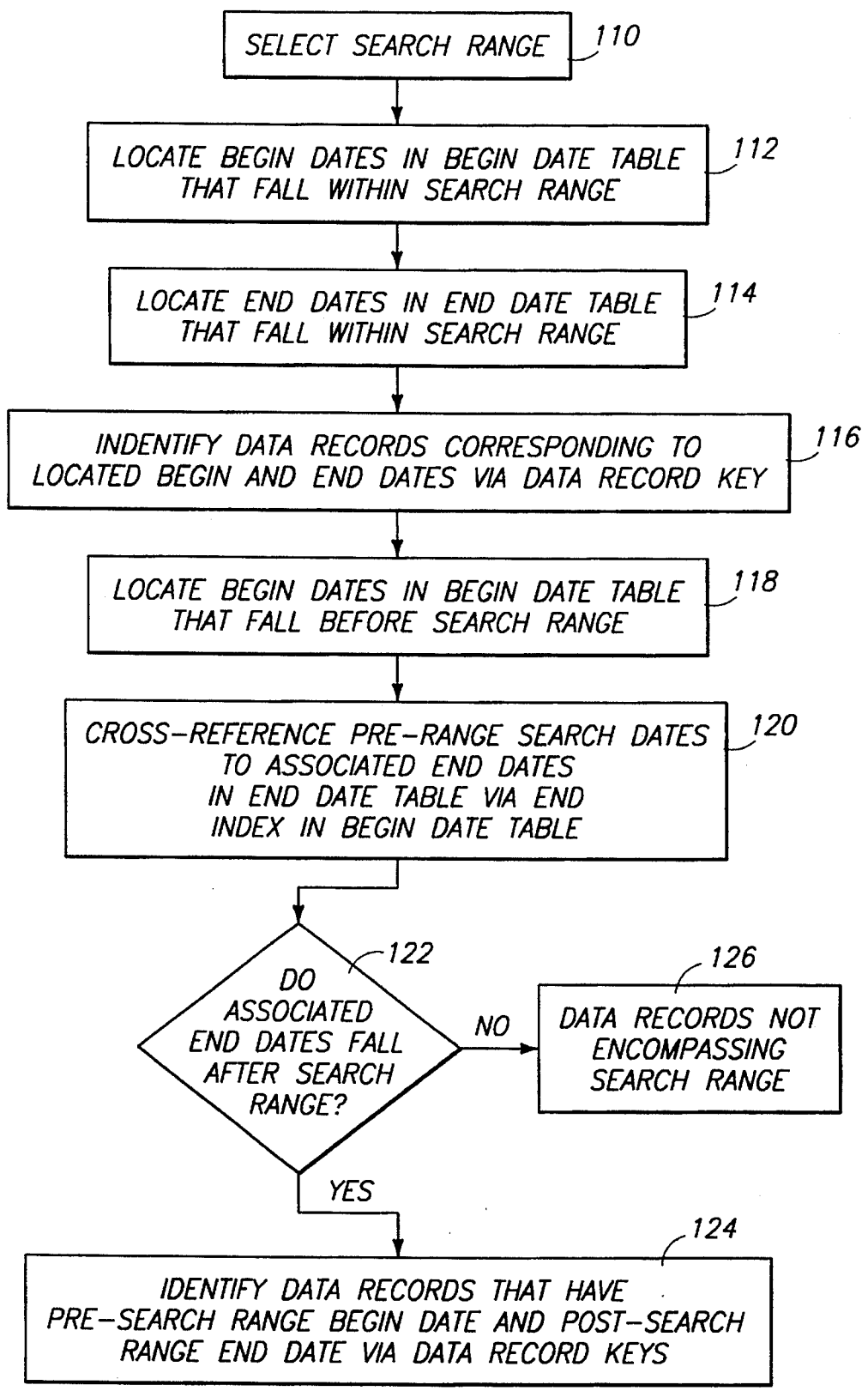

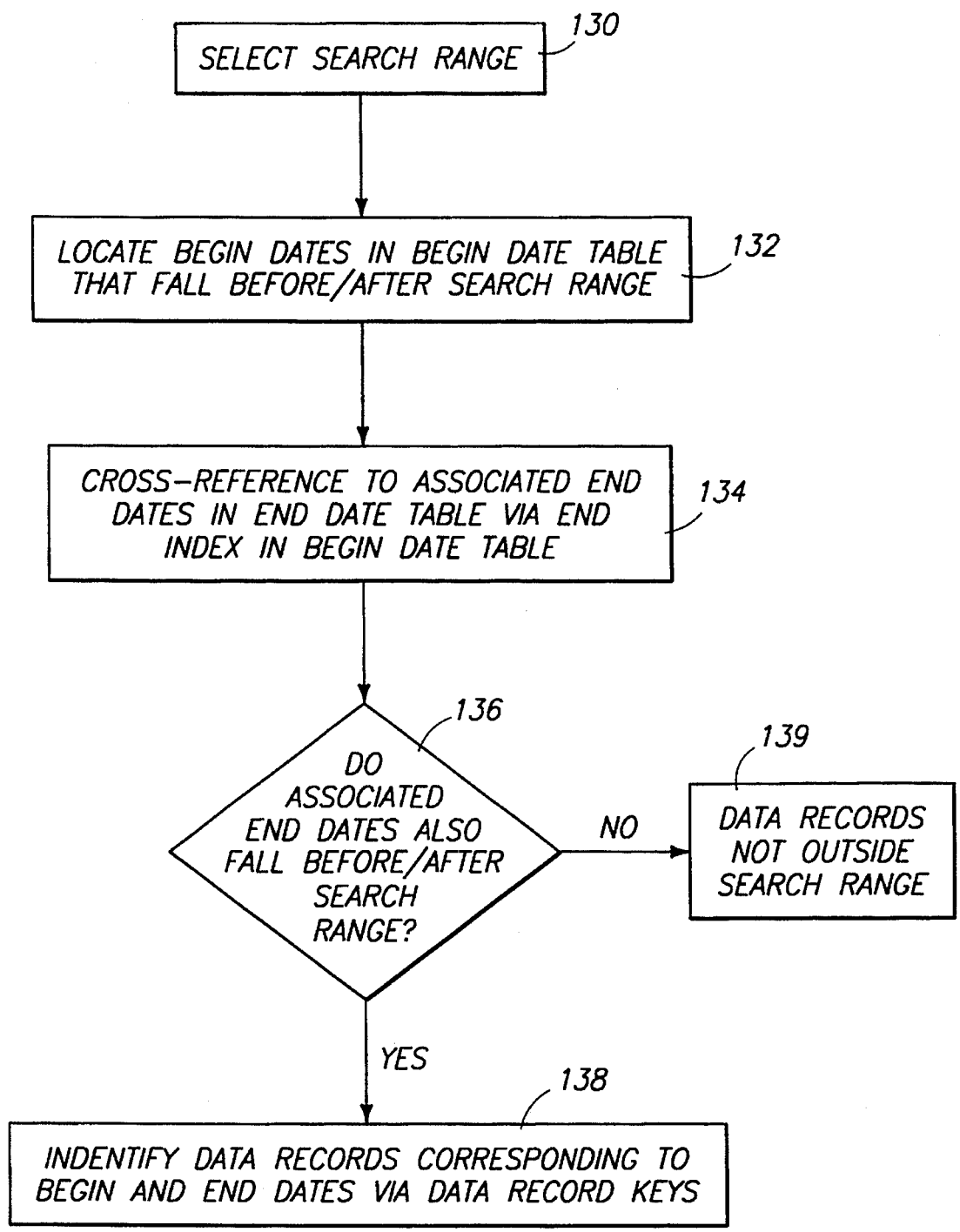

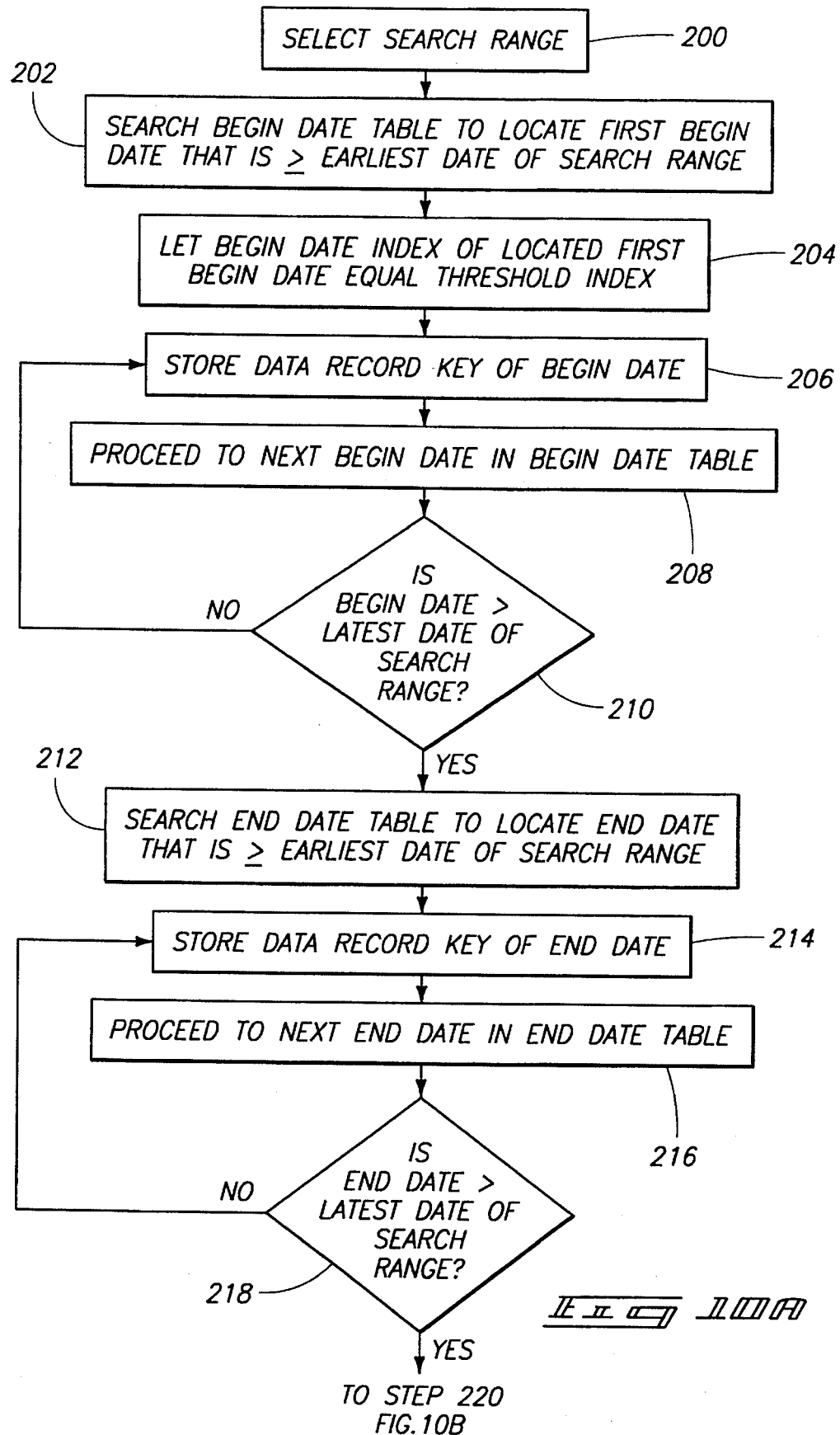

| BEGIN INDEX | | | |
|---|---|---|---|
| | BEGIN DATE | END DATE | DATA RECORD KEY |
| 0 | 1912 | 1984 | 4 |
| 1 | 1920 | 1925 | 6 |
| 2 | 1931 | 1945 | 7 |
| 3 | 1939 | 1941 | 3 |
| 4 | 1942 | 1944 | 1 |
| 5 | 1943 | 1946 | 2 |
| 6 | 1947 | 1965 | 5 |

| END INDEX | | | |
|---|---|---|---|
| | END DATE | BEGIN DATE | DATA RECORD KEY |
| 0 | 1925 | 1920 | 6 |
| 1 | 1941 | 1939 | 3 |
| 2 | 1944 | 1942 | 1 |
| 3 | 1945 | 1931 | 7 |
| 4 | 1946 | 1943 | 2 |
| 5 | 1965 | 1947 | 5 |
| 6 | 1984 | 1912 | 4 |

FIG. 11

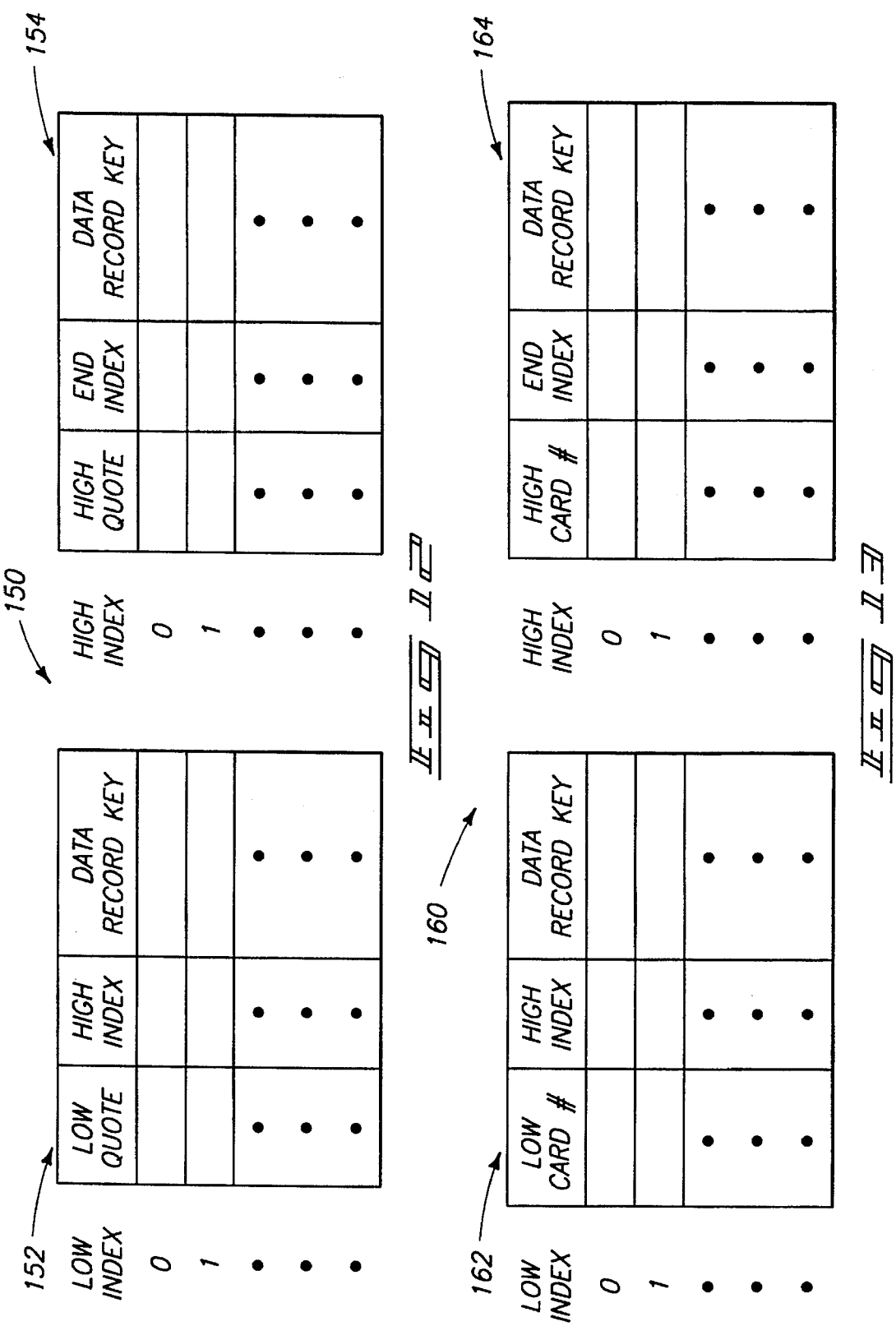

| BEGIN X INDEX | BEGIN X | END X INDEX | DATA RECORD KEY | $Y_1$ | $Y_2$ |
|---|---|---|---|---|---|
| 0 | | | | | |
| 1 | | | | | |
| ⋮ | ⋮ | ⋮ | ⋮ | ⋮ | ⋮ |

| END X INDEX | END X | BEGIN X INDEX | DATA RECORD KEY | $Y_1$ | $Y_2$ |
|---|---|---|---|---|---|
| 0 | | | | | |
| 1 | | | | | |
| ⋮ | ⋮ | ⋮ | ⋮ | ⋮ | ⋮ |

FIG 15

SYSTEM FOR IDENTIFYING DATA RECORDS IN A DATABASE USING A DATA STRUCTURE WITH LINKED PARAMETERS IN A SEARCH RANGE

TECHNICAL FIELD

This invention relates to methods for searching data records on storage mediums, such as CD-ROMs, disk drives, non-volatile RAM (NVRAM), and the like. This invention also relates to data search structures for use in such searching, and methods for constructing them.

BACKGROUND OF THE INVENTION

Conventional databases are capable of holding thousands of data records. One growing class of databases are CD-ROM (Compact Disk-Read Only Memory) storage systems. In CD-ROM storage, the data records are fixed and cannot be dynamically altered. CD-ROM storage systems are a very useful storage medium for holding historical data, research data, and the like.

In any database system, such as a CD-ROM storage system, it is a normal and desirable function to be able to search for certain data records. When a request is made for an individual record, the search typically involves comparing each data record with the request until the desired record is located. Once the record is located, the search is terminated.

It is often desirable to search for not just one record, but for a group of records that satisfy a set of search criteria. When a request is made to search for data records satisfying a criteria, conventional databases again conduct a record-by-record comparison. Those records satisfying the criteria are kept and those records that fail the criteria are rejected. This iterative process is continued through the entire database to ensure that no data records are overlooked.

As databases evolve to hold more and more records, the iterative record-by-record comparison is increasingly unsatisfactory because it requires significant time and processing resources. To search a single CD-ROM holding thousands of records, a common search time for a group of criteria-satisfying data records might be a few seconds. To search larger databases, the time can be even longer.

It is therefore an objective of this invention to devise a database search technique which performs a group search function in a more instantaneous time frame.

SUMMARY OF THE INVENTION

According to one aspect of this invention, a data search structure is provided for use in searching and identifying data records stored on a storage medium, such as CD-ROM. The data records can be characterized by various search parameters. For instance, the data records might be articles that have associated search parameters in the form of dates pertaining to subject matter covered in the articles. The data search structure is a compact representation of the data records stored in the database which can be efficiently searched. The data search structure is configured as two or more tables that list the search parameters of the data records in a selected order and contain additional information correlating the parameters between the tables. The data search structure is preferably preconstructed and stored on the CD-ROM with the data records.

More specifically, the data search structure has a first parameter table comprising three data fields: a first data field which lists first search parameters of the data records in a selected order (e.g., begin dates of the data records listed in chronological order); a second data field which contains cross-referencing information relating the first search parameters to second search parameters; and a third data field which contains record keys to identify the data records associated with the first search parameters.

The data search structure also has a second parameter table comprising three data fields: a first data field which lists the second search parameters of the data records in a selected order (e.g., end dates of the data records listed in chronological order); a second data field which contains cross-referencing information relating the second search parameters to the first search parameters; and a third data field which contains the record keys to identify the data records associated with the second search parameters.

According to other aspects of this invention, various methods are provided for searching and identifying data records that satisfy selected search criteria. According to one method, it is desired to find those data records which fall entirely within the search range. This is accomplished by searching the first parameter table to locate first search parameters that fall within the search range and referencing the second search parameters associated with the located first search parameters to determine if the second search parameters likewise fall within the search range.

According to another method, those data records which fall within and overlap the search range can be located. This is done by searching the first and second parameter tables to locate all first and second search parameters that fall within the search range.

According to yet another method, those data records that encompass the search range can be located. This is accomplished by searching the first parameter table to locate first search parameters that fall before the search range and searching the second parameter table to locate second search parameters that fall after the search range.

Other search methods can also be performed using the search structure, including locating those data records that fall entirely outside of the search range. Combinations of these various methods are also possible.

BRIEF DESCRIPTION OF THE DRAWINGS

The same reference numerals are used throughout to reference like components and features.

FIG. 1 illustrates a computer system having a CD-ROM storage unit.

FIG. 2 demonstrates five types of data records as they relate to a specified search range.

FIG. 3 is a list of example set of seven data records used for explaining various aspects of this invention.

FIG. 4 is a diagrammatical illustration of a data search structure according to one aspect of this invention.

FIG. 5 is a flow diagram of a method for constructing the data search structure according to another aspect of this invention.

FIG. 6 is a flow diagram of a first method for searching data records on a storage medium according to yet another aspect of this invention. This first method locates data records which are contained entirely within a specified search range.

FIG. 7 is a flow diagram of a second method for searching data records on a storage medium which locates data records that are contained within and overlap a specified search range.

FIG. 8 is a flow diagram of a third method for searching data records on a storage medium which locates data records that fall within, overlap, and encompass a specified search range.

FIG. 9 is a flow diagram of a fourth method for searching data records on a storage medium which locates data records that fall completely outside of a specified search range.

FIGS. 10A and 10B depict a flow diagram of a method for searching data records using table indexes of the FIG. 4 data search structure according to yet another aspect of this invention.

FIG. 11 is a diagrammatical illustration of a modified data search structure according to an aspect of this invention.

FIG. 12 is a diagrammatical illustration of yet another data search structure.

FIG. 13 is a diagrammatical illustration of another data search structure.

FIG. 15 is a diagrammatical illustration of still another data search structure.

DETAILED DESCRIPTION OF THE PREFERRED EMBODIMENTS

Figure 10B:
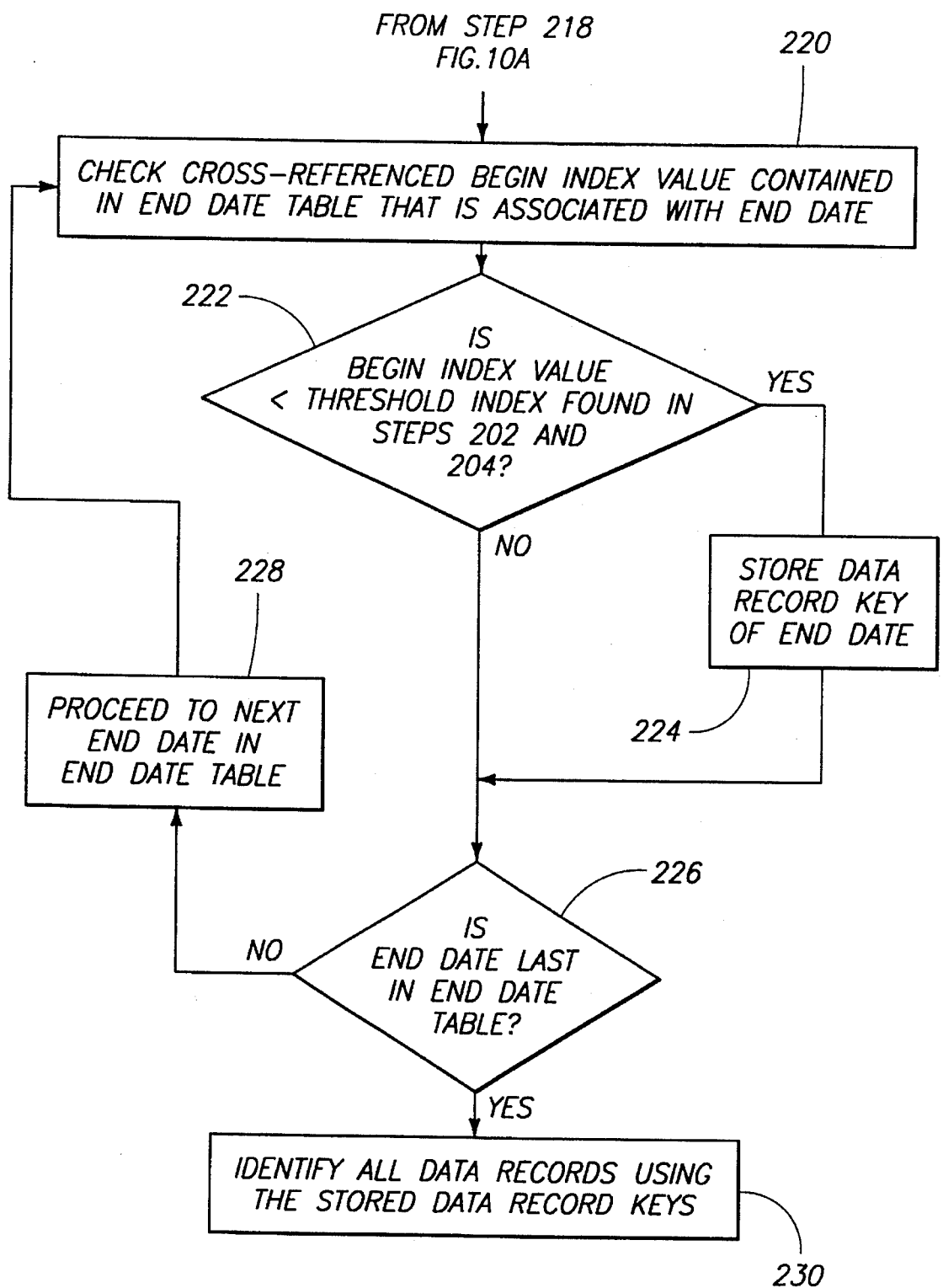

For purposes of explanation, aspects of this invention will be described in the context of a CD-ROM database storage system. However, this invention may be readily used in other database systems, such as disk drive storage systems, non-volatile RAM storage systems, and the like.

FIG. 1 shows a computer system 20 having a monitor 22, a central processing unit 24, a keyboard 26, and a CD-ROM I/O device 28. The CD-ROM I/O device 28 receives one or more CD-ROMs 30 that contain many data records. For example, a CD-ROM might hold 20,000–30,000 data records. These data records are static and unalterable, as is customary in CD-ROM technology. When inserted into the CD-ROM I/O device 28, the combined unit forms a CD-ROM database containing many thousands of records. While this simple CD-ROM I/O device 28 is demonstrated for discussion, other conventional CD-ROM database storage systems can be alternatively used in conjunction with this invention.

The data records stored on the CD-ROM are characterized by associated search parameters. For example, the data records might be articles or documents that have associated search parameters in the form of dates pertaining to subject matter covered therein or the articles themselves. The data records might be stock prices that have associated search parameters in the form of high and low stock quotes. The data records might be baseball cards or comic books with search parameters of lot or production number, or arbitrarily assigned numbers. The data records might be spatial locations having planar coordinates as their search parameters. Many different forms of data records, having many different kinds of search parameters, can be used in conjunction with this invention.

For discussion of FIGS. 2–11, data records that have dates as their search parameters will be used to explain and describe the features of this invention. Other example forms of data records, and methods for searching them, will be described below in more detail with reference to FIGS. 12–15.

In database searching operations, it is common for a user to request all data records that satisfy certain search criteria. The request yields a subset of the entire volume of data records contained in the database. One example search, that will be used throughout this disclosure, is to identify all data records that are relevant to the time span of 1940 to 1945. This time span of 1940–1945 is thus an example of a selected search range. The data records have one or more date ranges which can be related to the search range. Each date range of a data record has a begin date and an end date.

FIG. 2 illustrates five different types of data records which are distinguishable on the basis of how they relate to the search range of 1940 to 1945. The first type of data record (designated "Type 1" in the figure) has a date range contained entirely within the search range. For instance, its begin date (designated by the left most "x") falls within the search range, as does its end date (designated by the right most "x"). The second type of data record (designated "Type 2" in the figure) has a date range which overlaps the end criteria of the search range. In Type 2, the record begin date falls within the search range, but the end date falls after the search range. The "Type 3" data record overlaps the beginning criteria of the search range so that the begin date falls before the search range and the end date falls within the search range.

The fourth type of data record (designated "Type 4" in FIG. 2) has a date range which encompasses the search range. The begin date lies before the search range and the end date falls after the search range. The fifth type of data record (designated "Type 5") falls entirely outside of the search range. That is, the begin and end dates of the data record either both fall before or both fall after the search range. It is also noted that one data record might have more than one date range and thus qualify as multiple types.

According to various methods of this invention, the user can search for data records of any type, independently of the other types or together with one or more other types. For instance, the searcher may wish to find all data records which pertain to the search range of 1940 to 1945. This search request would find data records of Types 1–4. Alternatively, it might be desirable to find only those data records contained entirely within the search range of 1940 to 1945 (Type 1) or only those data records that fall entirely outside the search range (Type 5).

FIG. 3 is an example set of seven data records that will be used to explain the various search methods of this invention. The associated date ranges, and the type designation, are provided for the seven records. The first date represents the begin date and the second date represents the end date. For instance, data record 7 has a date range consisting of a begin date of 1931 and an end date of 1945. It is a Type 3 because it overlaps the first criteria of the search range (1940–1945). All five types are represented in this set of example records.

Data Search Structure

According to one aspect of this invention, a data search structure is provided to facilitate instantaneous searching for a subset of data records stored on the CD-ROM that satisfy a selected search range. FIG. 4 shows a data search structure 40 consisting of a begin date table 42 and an end date table 44. The begin date table 42 has three data fields. A first data field 46, entitled "Begin Date", lists all of the begin dates of the example seven records in chronological order. A second data field 48, named "End Index", contains cross-referencing information correlating the begin dates with their respective end dates in the end date table 44. A third data field 50, called "Data Record Key" contains record keys that identify the data records associated with the begin and end dates.

Similarly, the end date table 44 has three data fields. A first data field 52, entitled "End Date", chronologically lists the end dates of the seven records of FIG. 3. A second data field 54, named "Begin Index", contains cross-referencing information correlating the end dates with their respective begin dates in the begin date table 42. A third data field 56, called "Data Record Key", contains the record keys.

Each table has a table entry index which indicates the location of the dates within their respective tables. The "begin index" 58 marks the entries to the begin date table 42, and the "end index" 60 accounts for the entries to the end date table 44. The begin and end indexes are not stored values, but instead are positional information designating location within tables. They are used to index specific entries in the table and as the cross-referencing information in the second data fields 48 and 54 of the two tables.

The pair of tables contains all of the relevant search information for the example seven records. For instance, data record 7 (FIG. 3) has a date range of 1931–1945. The begin date of 1931 appears in begin date table 42 as begin index entry 2, and is identified by the data record key in data field 50 as pertaining to data record 7. The end date of 1945 appears as end index entry 3 in end date table 44, and is identified by the data record key in data field 56 as pertaining to data record 7. The 1931 begin date in begin date table 42 is cross-referenced to its associated 1945 end date in end date table 44 by the end index "3" found in the second data field 48 of begin date table 42. Similarly, the 1945 end date in end date table 44 is cross-referenced to its associated 1931 begin date in begin date table 42 by the begin index "2" found in the second data field 54 of end date table 44.

The begin and end date tables can be preconstructed and stored on the CD-ROM along with the data records themselves. Preconstruction is permissible because the data records are static and unalterably stored on CD-ROM. The tables can be referenced directly on the CD-ROM by CPU 24 (FIG. 1) during a database search. Alternatively, the preconstructed tables can be transferred over to memory (such as DRAM or NVRAM) within CPU 24 during an initialization or power-up operation.

As an alterative to preconstruction, the data search tables can be constructed during initialization and maintained in the CPU memory. The data records contained on the CD-ROMs would simply be scanned to extract the desired information for building the tables. FIG. 5 shows a method for constructing the data search structure 40 according to another aspect of this invention. First, unique record keys are assigned to each data record stored on the CD-ROM (step 70). At step 72, the begin dates of the data records are listed chronologically in data field 46 in begin date table 42. The record keys are listed in data field 50 of the begin date table in a corresponding manner to the begin dates (step 72). The end dates of the data records are listed chronologically in data field 52 of end date table 44 (step 76), and the corresponding record keys are listed in data field 56 (step 78). As the data records might pertain to more than one time period, individual data records may have one or more pairs of begin and end dates. After the begin and end dates are listed in their respective tables, they are correlated (step 80). Preferably, the begin and end dates are cross-referenced between the tables using the table index values. Other correlation techniques are possible, however, such as listing the begin and end dates in both tables as shown and discussed below with reference to FIG. 12.

The begin and end date tables are a compact data representation of the large volume of data records. The tables are comparatively small, whereby each data field 46–56 is preferably only 2–4 bytes wide. As one example implementation, suppose a CD-ROM contained 27,000 data records. The data search structure 40 for this CD-ROM might require only 12 bytes for each record (i.e., two bytes for each data field 46–56) if dates can each be represented by only two bytes. This construction would consume approximately 324K bytes of memory. As another example, suppose that four bytes were needed to represent the begin and end dates so that the first data fields 46 and 52 in each table were configured to be four bytes wide. Each data record would then require 16 bytes and the entire search structure would consume only approximately 432K bytes. The search structure therefore consumes comparatively little space.

Due to their compact size, the tables of the search structure can be efficiently searched to instantly identify data records that satisfy a selected search criteria from the 27,000 data records contained on the CD-ROM. The CPU 24 may be configured as a record range filtering subsystem which searches the condensed data search structure 40 provided on the CD-ROM 30 or within the CPU RAM memory. The CPU 24 uses the search structure to identify one or more of the various Types of data records.

Methods for Searching

FIGS. 6–9 provide various methods for searching data records on a storage medium using the data search structure 40 of FIG. 4.

FIG. 6 illustrates a method for identifying data records (having begin and end dates) that fall entirely within a selected search range (i.e., a Type 1 data record). At step 90, a desired search range (e.g., 1940–1945) is selected. The begin date table 42 is then searched to locate all begin dates that fall within the selected search range (step 92). In our example set of seven records, the begin dates of 1942 and 1943 at respective begin indexes 4 and 5 (FIG. 4) satisfy this search. These begin dates correspond via the data record keys to data records 1 and 2 (FIG. 3).

At step 94 of FIG. 6, the located begin dates are quickly cross-referenced to associated end dates in end date table 44 via the end index in the second field 48 of begin date table 42. With reference to FIG. 4, the begin date of 1942 has a cross-reference to end index entry 2 in end date table 44, which is the end date of 1944. The begin date of 1943 cross-references to end index entry 4 in end date table 44, which is the end date of 1946. If the associated end date is also within the search range (i.e., the "yes" branch from decisional step 96 of FIG. 6), the data record is entirely within the search range and is identified using the record key (step 98). Here, the data record associated with the 1942 begin date and the 1944 end date falls entirely within the search range and is identified as data record 2 via the third fields 50 and 56 in each table.

On the other hand, if the associated end date is not within the search range (i.e., the "no" branch from decisional step 96), the data record is not entirely within the search range and need not be identified (step 100). The data record associated with the 1943 begin date and the 1946 end date has an end date outside the search range and thus, does not fall entirely within the search range. This record does not satisfy the search request and thus, does not need to be identified.

It is noted that this method can be modified by first locating end dates that lie within the selected search range and then quickly referencing the begin dates in the begin date table. This modified method would also yield all data records which fall entirely within the search range.

FIG. 7 depicts a method for identifying data records that fall entirely within and overlap a selected search range (i.e., data records of Types 1–3). As above, a search range (e.g., 1940–1945) is first selected (step 110). At step 112, the begin date table is searched for all begin dates that fall within the selected search range. This step finds all data records of Types 1 and 2, although it cannot distinguish between them. The search of the begin date table locates the begin dates of 1942 and 1943 at respective begin index entries 4 and 5 (FIG. 4).

At step 114, the end date table 44 is scanned to locate all end dates that fall within the selected search range. This step locates all data records of Types 1 and 3. This search locates the end dates of 1941, 1944, and 1945 at respective end index entries 1–3 in end date table 44. The combination of steps 112 and 114 automatically find all data records that fall entirely within the search range, and thus, the cross-referencing technique described above with respect to FIG. 6 is not used in this method.

At step 116, the records located by these searches of the two tables are identified via the data record keys. The data record keys associated with begin dates of 1942 and 1943, and with end dates of 1941, 1944, and 1945, point to data records 1, 2, 3, and 7. Each of these records fall entirely within or overlap the search range, and hence satisfy the search request. It is noted that the method steps 112 and 114 could be reversed without any effect on the outcome of the search.

FIG. 8 shows a method for searching data records on a storage medium that fall entirely within, overlap, and encompass a selected search range (i.e., data records of Types 1–4). Steps 110–116 are identical to those discussed above with reference to FIG. 7. These steps yield all data records which fall within, as well as overlap, the search range. At step 118, the begin date table 42 is searched for all begin dates that fall before the search range (i.e., before 1940). This effort locates the begin dates of 1912, 1920, 1931, and 1939 at respective begin index entries 0–3 of begin date table 42.

At step 120, the located pre-search range begin dates are cross-referenced using the end index in begin date table 42 to associated end dates in end date table 44. Begin date 1912 cross-references to end index entry 6, or an end date of 1984. Begin date 1920 cross-references to end index entry 0, which is end date 1925. Begin date 1931 cross-references to end index entry 3, which is end date 1945. Begin date 1939 cross-references to end index entry 1, which is end date 1941.

At step 122, it is determined whether the associated end dates fall after the search range (i.e., after 1945). If so (i.e., the "yes" branch from decisional step 122), the data records encompass the search range and thus should be identified via the data record keys (step 124). Conversely, if the end dates do not fall after the search range (i.e., the "no" branch), the data records do not encompass the search range and need not be identified (step 126).

In this example, only the data record having a begin date of 1912 and an end date of 1984 encompasses the 1940–1945 search range. Using the data record key, data record 4 is located. The other data records do not encompass the search range.

Accordingly, the method of FIG. 8 identified the following data records: (1) data record 1—a Type 1 data record that has its begin and end dates falling within the search range; (2) data records 2, 3, and 7—Types 2 and 3 data records which have either their begin or end dates falling within the range; and (3) data record 4—a Type 4 data record which has its begin date falling before the search range and its end date falling after the search range.

The order of the steps presented in the method of FIG. 8 can be rearranged without disrupting the results. For instance, the Type 4 data records could be located first (i.e., steps 118–124) before the Type 1–3 data records are found (i.e., steps 112–116). Moreover, the identification steps 116 and 124 can be combined as one step occurring after all suitable begin and end dates have been located. It is further noted that the search method with respect of Type 4 data records can be easily modified to first locate end dates falling after the search range, and then cross-referencing to associated begin dates to determine whether they fall before the search range.

Additionally, the process of locating Type 4 data records that encompass the search range may be conducted independently of efforts to locate other types of data records, or in combination with other searches. For example, it might be desirable to locate only Types 1 and 4 data records (i.e., those entirely within, as well as encompassing, the search range). In this situation, steps 90–98 of the FIG. 6 method might be combined with steps 118–124 of the FIG. 8 method.

FIG. 9 shows a method for identifying data records that fall entirely outside the selected search range (i.e., Type 5 data records). Type 5 data records include data records that lie completely before the search range and data records that fall completely after the search range. The processes for identifying both kinds of Type 5 data records are essentially identical. For purposes of explanation, the steps of identifying data records which fall before the search range will be discussed first.

At step 130, a search range (e.g., 1940–1945) is selected. Next, the begin date table is scanned for all begin dates that fall before the search range (step 132). This locates begin dates 1912, 1920, 1931, and 1939 at begin index entries 0–3. At step 134, these begin dates are cross-referenced via the end index in begin date table 42 to associated end dates in end date table 44. The associated end dates are 1984 (at end index 6), 1925 (at end index 0), 1945 (at end index 3), and 1941 (at end index 1).

At decisional step 136, it is evaluated whether the associated end dates also fall before the search range. If so (i.e., the "yes" branch), the data records do indeed lie entirely before the search range and thus, are identified via the data record keys (step 138). If not (i.e., the "no" branch), the data records are not entirely outside of the search range (step 139), but instead overlap or encompass the search range. Such records do not satisfy the search request. In the example set of data records, only the data record having a begin date of 1920 and an end date of 1925 fall entirely before, and hence outside, the search range. The data record key associated with these dates identify data record 6.

To complete a search for all Type 5 data records, the above method is also performed to locate those begin and end dates that fall entirely after the search range. This search locates data record 5 which has a begin date of 1947 and an end date of 1965. As a result, the completed search locates records 5 and 6 which fall entirely outside of the selected search range.

It is noted that the FIG. 9 search can readily be used to find only those records falling entirely before the search range or only those records falling entirely after the search range.

Some of the methods described with reference to FIGS. 6–9 are described as batch processes, where all begin dates are first located, then cross-referenced to associated end dates, then evaluated, etc. The methods may also be performed on a record-by-record basis. For example, once a qualifying begin date is located, it might be immediately cross-referenced to its associated end date for examination.

Using Table Indexes In Search Process

The methods described above with reference to FIGS. 6–9 consider search techniques from a more general records basis. However, these methods may also be conducted in a streamlined manner through use of the table index pointers in data search structure 40 of FIG. 4.

FIGS. 10A and 10B depict an example method for identifying Types 1–4 data records using the table indexes to enhance search speed and efficiency. At step 200, a search range (e.g., 1940–1945) is selected. The begin date table 42 is then searched to locate the first listed begin date that is greater than or equal to the initial or start boundary of the search range, which in this case is the earliest year 1940 (step 202).

Preferably, a binary search of the begin indexes is used. In a binary search, the begin date positioned at the middle index of the begin date table is evaluated first. This center entry bisects the table into upper and lower halves. If the begin date is earlier than the earliest date of the search range, the table pointer jumps to the begin date positioned at the begin index that lies at the middle of the lower half of the table. Conversely, if the begin date is later than the earliest date of the search range, the table pointer jumps to the begin date entered at the begin index at the middle of the upper half of the table. This table bisecting process continues until the qualifying begin date is located. The binary search therefore rapidly homes in on the desired begin date. The speed of the binary search is aided by the fact that only a handful of data records are actually evaluated during the search.

In the above example set of seven data records, the binary search would ultimately locate the begin date of 1942 at begin index entry 4. This begin index entry 4 is set as the begin threshold index (step 204) which will be used later in the method. The corresponding data record key of "1" is extracted from the begin date table and stored in temporary memory, such as in RAM memory of CPU 24 (step 206). At step 208, flow is continued to the next begin date of 1943 in begin date table 42.

At step 210, a determination is made as to whether the next begin date is also within the search range, or instead falls outside of the search range (i.e., the begin date is greater than the latest date of 1945). If the next begin date is within the search range (i.e., the "no" branch), flow returns to step 206 where the associated data record key of "2" is stored. Flow continues linearly through the begin dates until the next begin date falls outside the search range, which is the case for the begin date of 1947.

When the next begin date falls outside of the search range (i.e., the "yes" branch from step 210), a very similar binary search is commenced on end date table 44 beginning (step 212). A binary search is conducted to locate the first listed end date that is greater than or equal to the earliest date of the search range. Here, the end date of 1941 at end index 1 satisfies this binary search. At step 214, the data record key of "3" is extracted from the end date table and stored in CPU memory. The next end date of 1944 is then evaluated (step 216) to determine whether it falls outside the search range (step 218). If the end date is within the search range, its data record key is also temporarily stored, and so on. The process continues to loop until the next end date falls outside of the search range, which happens to occur for end date 1946 at end index 4. The end index 3 associated with the previous end date of 1945 is then set as the end threshold index, thereby establishing a line between those end dates within the search range and those outside of the search range.

Steps 200–218 essentially yield all data record keys for those data records of Types 1–3. To obtain the data record keys for Type 4 data records, steps 220–226 must also be conducted. At steps 220 and 222, the begin indexes stored in the second data field 54 of end date table 44 which correspond to the end dates falling after the search range are checked to see if they fall before the begin threshold index 4 with respect to begin date table 42. Recall from steps 202 and 204 that this begin threshold index was set as a result of the binary search that located the begin date 1942 at index 4. If the cross-referencing begin indexes in end date table 44 are less than this begin threshold index, the associated begin date must also lie before the begin date of 1940. The corresponding record in this case is a Type 4 data record and thus the data record key is temporarily stored (step 224).

In the continuing example, end indexes 4–6 in end date table 44 are processed. End index 4 (i.e., end date 1946) has a begin index of "5" which does not fall before the begin threshold index 4. Thus, flow proceeds directly to the next end date at end index 5. End index 5 (i.e., end date 1965) has a begin index of "6" which also does not fall before the begin threshold index 4. Flow therefore continues to the next end date 1984 at end index 6 which has a begin index of "0". This cross-referencing begin index does indeed fall before the begin threshold index 4. Accordingly, the data record key of "4" is extracted from the end date table and temporarily stored.

At step 226, it is determined whether the last end date in the end date table has been evaluated. If not (i.e., the "no" branch), flow proceeds to the next end date (step 228) for evaluation of its associated cross-referencing begin index (step 220). On the other hand, if the last end date has been reached (i.e., the "yes" branch), the search for Types 1–4 data records is complete. All data records associated with the stored data record keys are then identified at step 230. In the example, data record 1 (1942–1944—Type 1), data record 2 (1943–1946—Type 2), data record 3 (1939–1941—Type 3), data record 4 (1912–1984—Type 4), and data record 7 (1931–1945—Type 3) were identified.

Of course, the search can be modified within the context of this invention. For instance, steps 202–210 and steps 212–218 can be performed in reverse order. Additionally, steps 220–226 can be alternately conducted by checking cross-referenced end index values contained in the begin date table 42 for begin dates that fall before the begin threshold index to see of the end index values fall after the end threshold index. It is further noted that the methods described above with reference to FIGS. 6–9 can be conducted using the binary search techniques of table indexes in the manner described here with reference to FIGS. 10A and 10B.

Modified Date Search Table

FIG. 11 illustrates a data search structure 140 consisting of a begin date table 142 and an end date table 144. The data search structure 140 differs from the structure 40 of FIG. 4 in that the cross-referencing fields 48 and 54 (FIG. 4) are replaced with explicit reference to the associated end dates. That is, begin date table 142 has a second data field 146, titled "End Date", which lists the associated end dates in a corresponding manner to the begin dates. Similarly, end date table 144 has a second data field 148, titled "Begin Date", which lists the associated begin dates in a corresponding manner to the end dates.

As an example search for data records of Types 1–4 using the search structure 140, the search method of FIGS. 10A and 10B can be used with the slight modification to the cross-referencing steps 220–222. Instead of comparing cross-referencing begin/end indexes to threshold indexes, the cross-referencing begin/end dates themselves can be compared to the search range. For search structure 140, the begin dates stored in second data field 148 of end date table 144 are checked for those end dates falling after the end threshold index 3 to see if the begin dates come before the start boundary 1940 of the search range.

This alternative construction can be used where there is no memory space savings in using a cross-referencing index. In general, a cross-referencing index scheme, such as that used in the tables of FIG. 4, is useful at reducing size when more than two bytes are required to properly express the information and there are less than $2^8$, or approximately 65,000, entries. If these two parameters are met, the tables of FIG. 4 which employ the cross-referencing index scheme consume less space in memory than the tables of FIG. 11. Otherwise, the tables of FIGS. 4 and 11 are approximately equal in size;.

Assume, for example, that four bytes are necessary to express the begin and end dates and that there are fewer than 65,000 entries. In this situation, the cross-referencing second data fields 48 and 54 of both tables 42 and 44 in FIG. 4 can be constructed with a width of only two bytes, whereas the second data fields 146 and 148 of tables 142 and 144 would be four bytes wide. As a result, the use of index values to cross-reference the two tables saves four bytes per data record, or 108K bytes of memory.

If the reduction in table size is desired, the tables can be structured in such a manner to ensure that the number of entries remain less than 65,000. Suppose the date tables were designed to handle data records having begin dates as early as 15,000,000 BC and possible end dates as late as 2000 AD. For this range, the years from 2000 BC to 2000 AD can be represented year-by-year and all years prior to 2000 BC can be expressed in increments of, say, 1200 years. In this manner, two bytes can be effectively used to cross-reference all entries since the number of entries for the years from 15,000,000 BC to 2000 AD will be less than 65,000.

Example Alternative Search Tables and Methods

FIG. 12 illustrates a data search structure 150 similar to search structure 40 of FIG. 4, but designed for data records related to financial information, such as price quotes, stock market high/low share prices, real estate buy/sell numbers, and the like, which can be searched based upon these monetary search parameters. Search structure 150 consists of a low quote table 152 and a high quote table 154. The low quote table 152 lists the low quotes (e.g., price of stock, car, house, etc.) in a monotonic order. The high quote table 154 lists the high quotes in a monotonic order. The low and high quotes are cross-referenced between the tables via the high/low index data fields. The tables can be searched for data records that have low/high quotes within, overlapping, encompassing, and/or outside a selected search range according to the methods described above with respect to FIGS. 6–9.

FIG. 13 shows a data search structure 160 similar to search structure 40 of FIG. 4, but designed for to represent an on-line database having thousands of data records related to trading cards, such as baseball cards, football cards, basketball cards, movie cards, musician cards, and the like. Such cards can be characterized by search parameters in the form of arbitrary numbers, such as lot or production series numbers. Search structure 160 consists of a low card table 162 which monotonically lists the low card numbers of the various active collectors and a high card table 164 which monotonically lists the high card numbers.

Suppose, for example, that a particular series of baseball cards is arbitrarily numbered from 0 to 20,000. A particular collector is interested in trading for cards 400–2000. The collector could select a search range of 400–2000 and search the tables for other collectors that have cards within this range for possible trade.

It is noted that similar search structures can be constructed for other trading merchandise, such as comic books.

Figure 14:
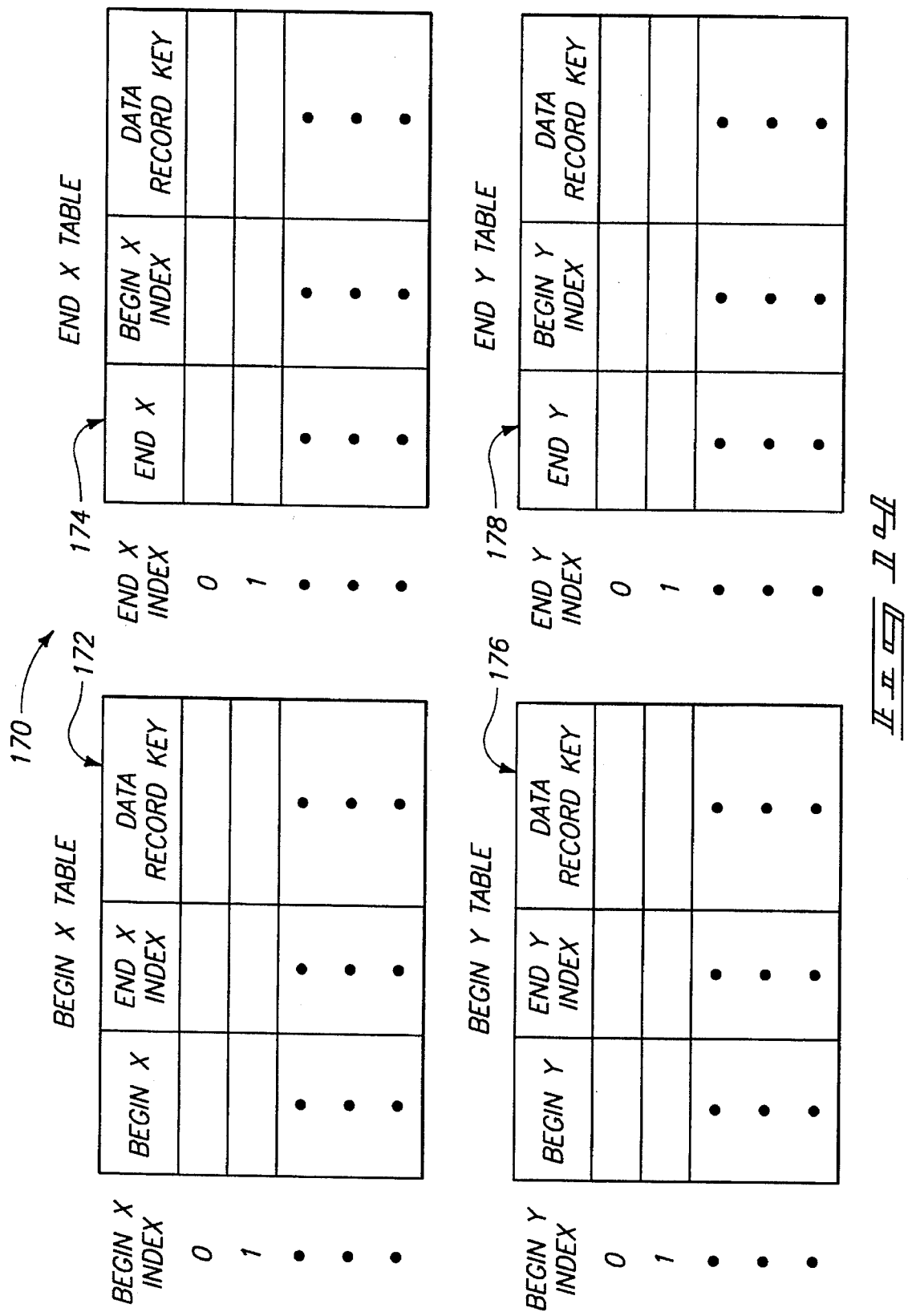
FIG. 14 is a diagrammatical illustration of still another data search structure.

FIG. 14 illustrates a data search structure 170 designed for representing data records that can be characterized by more than two search parameters. In the illustrated example, the data records pertain to spatial, two-dimensional objects which have search parameters in the form of their x and y coordinates. Search structure 170 consists of four tables: a begin x table 172 which monotonically lists all begin x values, an end x table 174 which monotonically lists all end x values, a begin y table 176 which monotonically lists all begin y values, and an end y table 178 which monotonically lists all end y values. The begin x and end x entries are cross-referenced between the two x tables 172 and 174 via their table indexes. Likewise, the begin y and end y entries are cross-referenced between the two y tables 176 and 178 via their table indexes. The tables also include columns for the data record keys to identify the associated data records.

An example use of this search method is for drawing a map of certain known coordinates. When constructing the map, it is useful to know what objects intersect the screen view, or contain the screen view entirely, and thus should be displayed on the map. The x and y values in the table represent the longitude and latitude, respectively, of those objects that might appear on the map within the screen view. For a selected screen, the longitude and latitude of the screen edges define the search range.

Suppose, for example, the user wants to view the geographical area of Montana and Wyoming that contains Yellowstone National Park. The x tables 172 and 174 are first searched to determine whether any x coordinates (i.e., longitudes) match the search range for the displayed Yellowstone area. Items such as Old Faithful and West Yellowstone town would satisfy this search, but not items such as Chicago or the Tower of London would not.

A second search for the latitude coordinates must also be conducted. This second search eliminates items which satisfy the longitude search but are not located in the screen view due to different latitudes. For example, the Grand Tetons in Wyoming are located geographically south of Yellowstone at approximately the same longitude, but are not at the same latitude as Yellowstone and thus should not be shown in a computer generated map of Yellowstone. The y tables 176 and 178 are thus also searched to determine whether any y coordinates (i.e., latitudes) that match the search range. When a match of both the x tables and the y tables occurs, that object can be depicted on the selected screen view.

FIG. 15 illustrates a data search structure 180 which is also designed to represent data records having more than two search parameters. The illustrated search structure is a two table version alternative to the four tables of the FIG. 14 search structure. Table 182 monotonically lists all begin x values and table 184 monotonically lists all end x values. Each table includes cross-referencing information and data record keys. These tables differ, however, in that they also include two data fields (designated by "$Y_1$" and "$Y_2$") which list the two y values corresponding to each begin x or end x entry.

To search for objects within a selected map screen, the begin x table 182 is searched for begin x values satisfying the search. The two y parameters can then be quickly checked to determine if they are within their y search range.

If not, the search disregards the begin x value. On the other hand, if the begin x and both y values satisfy the search request, a search or cross-reference to the end x table 184 is made to determine whether the end x also satisfies the search request.

The data search structures and methods of this invention offer tremendous advantages in terms of increasing search speed and efficiency. The compact data representation permits instantaneous identification of a group of records that satisfy a particular search request from the 20,000–30,000 data records contained in the database. The data search structures themselves are very compact and consume less than one megabyte of memory space.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method for searching data records on a storage medium, the method comprising the following steps:

providing data records on a storage medium, individual data records being characterized by associated first and second search parameters;

providing a first parameter table which lists the first search parameters of the data records in a selected order, the first parameter table containing record keys which relate the first search parameters to their associated data records;

providing a second parameter table which lists the second search parameters of the data records in a selected order, the second search parameters being associated with corresponding first search parameters, the second parameter table containing the record keys which also relate the second search parameters to their associated data records;

selecting a search range;

locating a first search parameter in the first parameter table which falls within the search range;

referencing a second search parameter that is associated with the located first search parameter to determine if the second search parameter falls within the search range; and in the event the second search parameter falls within the search range, identifying the data record corresponding to the associated first and second search parameters using the record key.

2. A method for searching data records according to claim 1 wherein the first and second search parameters are listed in the respective first and second parameter tables in a monotonic order.

3. A method for searching data records according to claim 1 wherein the first and second search parameters are in the form of dates which are listed chronologically in the respective first and second parameter tables.

4. A method for searching data records according to claim 1 wherein the first and second search parameters are in the form of monetary values which are listed monotonically in the respective first and second parameter tables.

5. A method for searching data records according to claim 1 wherein the first and second search parameters are in the form of arbitrary numbers assigned to the data records.

6. A method for searching data records according to claim 1 wherein:

the first and second parameter tables also contain table index numbers which cross-reference the first and second search parameters between the tables; and the referencing step comprises cross-referencing from the located first search parameter to the associated second search parameter using the table index number.

7. A method for searching data records according to claim 1 wherein:

each of the first and second parameter tables list both the first and second search parameters; and the referencing step comprises checking the second search parameter listed in the first parameter table that is associated with the located first search parameter.

8. A method for searching data records according to claim 1 wherein the first and second search parameters are listed in their respective first and second parameter tables in a monotonic order, and the first and second parameter tables also contain table index numbers which cross-reference the first and second search parameters between the tables;

the method further comprising:

locating a first search parameter in the first parameter table which falls before the search range;

cross-referencing the located first search parameter to the associated second search parameter using the table index number;

determining whether the cross-referenced second search parameter falls after the search range; and in the event that the cross-referenced search parameter falls after the search range, identifying the data record corresponding to the associated first and second search parameters using the record key.

9. A method for searching data records according to claim 1 further comprising:

providing data records that are individually characterizable by more than two search parameters; and providing more than two parameter tables for corresponding search parameters, the parameter tables listing the corresponding search parameters in a selected order.

10. A method for searching data records on a storage medium, the method comprising the following steps:

providing data records on a storage medium, individual data records being characterized by associated first and second search parameters;

providing a first parameter table which lists the first search parameters of the data records in a predetermined order, the first parameter table containing record keys which relate the first search parameters to their associated data records;

providing a second parameter table which lists the second search parameters of the data records in a predetermined order, the second parameter table containing the record keys which also relate the second search parameters to their associated data records;

selecting a search range;

locating a first search parameter in the first parameter table which falls within the search range;

locating a second search parameter in the second parameter table which falls within the search range; and identifying data records associated with the located first and second search parameters through the record keys.

11. A method for searching data records according to claim 10 wherein the first and second parameter tables also contain table index numbers which cross-reference the first and second search parameters between the tables;

the method further comprising:

locating a first search parameter in the first parameter table which falls before the search range;

cross-referencing the located first search parameter to the associated second search parameter using the table index number;

determining whether the cross-referenced second search parameter falls after the search range; and in the event that the cross-referenced search parameter falls after the search range, identifying the data record corresponding to the associated first and second search parameters using the record key.

12. A method for searching data records on a storage medium, the method comprising the following steps:

providing data records on a storage medium, individual data records being characterized by associated first and second search parameters;

providing a first parameter table which lists the first search parameters of the data records in a monotonic order, the first parameter table containing record keys which relate the first search parameters to their associated data records;

providing a second parameter table which lists the second search parameters of the data records in a monotonic order, the second search parameters being associated with corresponding first search parameters, the second parameter table containing the record keys which also relate the second search parameters to their associated data records;

selecting a search range;

locating a first search parameter in the first parameter table which falls after the search range;

referencing a second search parameter that is associated with the located first search parameter to determine if the second search parameter also falls after the search range; and in the event the second search parameter also falls after the search range, identifying the data record corresponding to the associated first and second search parameters using the record key.

13. A method for searching data records according to claim 12 further comprising:

locating a second search parameter in the second parameter table which falls before the search range;

referencing a first search parameter that is associated with the located second search parameter to determine if the first search parameter also falls before the search range; and in the event the first search parameter also falls before the search range, identifying the data record corresponding to the associated first and second search parameters using the record key.

14. A method for searching data records on a storage medium using a data search structure, the data records being characterizable by at least first and second search parameters, the data search structure having first and second parameter tables for listing respective first and second search parameters; the first parameter table comprising three data fields, a first data field which lists the first search parameters of the data records in a predetermined order, a second data field which contains cross-referencing information relating the first search parameters to the second search parameters, and a third data field which contains record keys to identify the data records associated with the first search parameters; the second parameter table comprising three data fields, a first data field which lists the second search parameters of the data records in a predetermined order, a second data field which contains cross-referencing information relating the second search parameters to the first search parameters, and a third data field which contains the record keys to identify the data records associated with the second search parameters; the method comprising the following steps:

selecting a search range;

locating a first search parameter in the first data field of the first parameter table which falls within the search range;

locating a second search parameter in the first data field of the second parameter table which falls within the search range;

locating another first search parameter in the first data field of the first parameter table which falls before the search range;

cross-referencing the located first search parameter that falls before the search range to an associated second search parameter using the cross-referencing information in the second data field of the first parameter table;

determining whether the cross-referenced second search parameter falls after the search range; and identifying all data records that have (1) both their first and second search parameters falling within the search range, (2) at least one of the first and second search parameters falling within the search range, and (3) their first search parameter falling before the search range and their second search parameter falling after the search range, said identification step using the record keys contained in the third parameters of the first and second parameter tables to identify the data records.

15. A method for searching data records according to claim 14 wherein the first and second search parameters are in the form of dates which are listed chronologically in the respective first and second parameter tables.

16. A method for searching data records according to claim 14 wherein the first and second search parameters are in the form of monetary values which are listed monotonically in the respective first and second parameter tables.

17. A method for searching data records according to claim 14 wherein the first and second search parameters are in the form of arbitrary numbers assigned to the data records.

18. A method for searching data records on a storage medium using a data search structure, the data records being characterizable by at least first and second search parameters, the data search structure having first and second parameter tables for listing respective first and second search parameters; the first parameter table comprising three data fields, a first data field which lists the first search parameters of the data records in a monotonically increasing order where individual first search parameters have an associated table index number indicative of location in the first parameter table, a second data field which contains table index numbers of the second parameter table to cross-reference the first search parameters to the second search parameters, and a third data field which contains record keys to identify the data records associated with the first search parameters; the second parameter table comprising three data fields, a first data field which lists the second search parameters of the data records in a monotonically increasing order where individual second search parameters have an associated table index number indicative of location in the second parameter table, a second data field which contains the table index numbers of the first parameter table to cross-reference the second search parameters to the first search parameters, and a third data field which contains the record keys to identify the data records associated with the second search parameters; the method comprising the following steps:

(a) selecting a search range defined by start and finish boundary criteria;

(b) searching the first data field of the first parameter table to locate a first search parameter which is greater than or equal to the start boundary criteria of the search range, the located first search parameter having an associated table index number which defines a first begin threshold index number for the first parameter table;

(c) proceeding from the located first search parameter at the first begin threshold index number through the listed first search parameters until locating a first search parameter which is greater than the finish boundary criteria of the search range, the first search parameter listed in the first parameter table just prior to the first search parameter located in this step (c) having an associated table index number which defines a first end threshold index number for the first parameter table;

(d) identifying, using the record keys contained in the third data field of the first parameter table, the data records associated with the first search parameters that are positioned in the first parameter table at, and between, the begin and end threshold index numbers;

(e) searching the first data field of the second parameter table to locate a second search parameter which is greater than or equal to the start boundary criteria of the search range, the located second search parameter having an associated table index number which defines a second begin threshold index number for the second parameter table;

(f) proceeding from the located second search parameter at the second begin threshold index number through the listed second search parameters until locating a second search parameter which is greater than the finish boundary criteria of the search range, the second search parameter listed in the second parameter table just prior to the second search parameter located in this step (f) having an associated table index number which defines a second end threshold index number for the second parameter table; and (g) identifying, using the record keys contained in the third data field of the second parameter table, the data records associated with the second search parameters that are positioned in the second parameter table at, and between, the begin and end threshold index numbers.

19. A method for searching data records according to claim 18 wherein the searching steps (b) and (e) comprise the steps of binary searching the respective first and second parameter tables.

20. A method for searching data records according to claim 18 further comprising the following additional steps:

(h) checking the table index numbers stored in the cross-referencing second data field of the second parameter table for second search parameters that are listed after the second end threshold of the second parameter table to determine whether the cross-referenced table index numbers of the associated first search parameters come before the first begin threshold index for the first parameter table; and (i) identifying, using the record keys contained in one of the first or second parameter tables, the data records that have a second search parameter listed after the second end threshold index of second parameter table and a first search parameter listed before the first begin threshold index of the first parameter table.

21. A method for searching data records according to claim 18 further comprising the following additional steps:

(h) checking the table index numbers stored in the cross-referencing second data field of the first parameter table for first search parameters that are listed before the first begin threshold of the first parameter table to determine whether the cross-referenced table index numbers of the associated second search parameters fall after the second end threshold index for the second parameter table; and (i) identifying, using the record keys contained in one of the first or second parameter tables, the data records that have a first search parameter listed before the first begin threshold index of the first parameter table and a second search parameter listed after the second end threshold index of the second parameter table.

22. A method for constructing a data search structure that represents data records stored on a storage medium, the data records being characterizable by first and second search parameters, the method comprising:

assigning individual record keys to the data records;

listing the first search parameters of the data records in predetermined order in a first parameter table, individual first search parameters having an associated table index number indicative of location in the first parameter table;

listing the record keys in the first parameter table in corresponding manner to the first search parameters;

listing the second search parameters of the data records in predetermined order in a second parameter table, individual second search parameters having an associated table index number indicative of location in the second parameter table;

listing the record keys in the second parameter table in corresponding manner to the second search parameters; and correlating the first and second search parameters between the first and second parameter tables.

23. A method for constructing a data search structure according to claim 22 wherein the step of correlating comprises cross-referencing the first and second search parameters using the associated table index numbers.

24. A method for constructing a data search structure according to claim 22 wherein the step of correlating comprises:

listing the second search parameters of the data records in the first parameter table in corresponding manner to the first search parameters; and listing the first search parameters of the data records in the second parameter table in corresponding manner to the second search parameters.

25. A data search system for searching data records, comprising:

a storage medium for storing multiple data records that are characterizable by at least first and second search parameters;

a condensed data search structure representative of the data records stored on the storage medium, the data search structure comprising:

first and second parameter tables for listing respective first and second search parameters;

the first parameter table comprising three data fields, a first data field which lists the first search parameters of the data records in a selected order, a second data field which contains cross-referencing information relating the first search parameters to the second search parameters, and a third data field which contains record keys to identify the data records associated with the first search parameters; and the second parameter table comprising three data fields, a first data field which lists the second search parameters of the data records in a selected order, a second data field which contains cross-referencing information relating the second search parameters to the first search parameters, and a third data field which contains the record keys to identify the data records associated with the second search parameters; and a record range filtering subsystem which searches the condensed data search structure to identify candidate data records on the storage medium that pertain to a specified search range.

26. A data search system according to claim 25 wherein the record range filtering subsystem is configured to find those data records which fall entirely within the search range by searching the first parameter table to locate first search parameters that fall within the search range and referencing the second search parameters associated with the located first search parameters to determine if the second search parameters likewise fall within the search range, the record range filtering subsystem using the record keys in the first parameter table to identify the data records.

27. A data search system according to claim 25 wherein the record range filtering subsystem is configured to find those data records which fall within and overlap the search range by searching the first parameter table to locate first search parameters that fall within the search range and searching the second parameter table to locate second search parameters that fall within the search range, the record range filtering subsystem using the record keys in the first and second parameter tables to identify the data records.

28. A data search system according to claim 25 wherein:

the first and second search parameters of the data records are listed in the first data fields of the respective first and second search tables in a monotonic order; and the record range filtering subsystem is configured to find those data records which encompass the search range by searching the first parameter table to locate first search parameters that fall before the search range and searching the second parameter table to locate second search parameters that fall after the search range, the record range filtering subsystem using the record keys in the first and second parameter tables to identify the data records.

29. A data search system according to claim 25 wherein the condensed data search structure is stored on the storage medium along with the data records.

30. A data search system according to claim 25 wherein the storage medium is CD ROM.

* * * * *